(Model.)
N. CLIMENHEGG.
STRAW CUTTER.
No. 247,311. Patented Sept. 20, 1881.
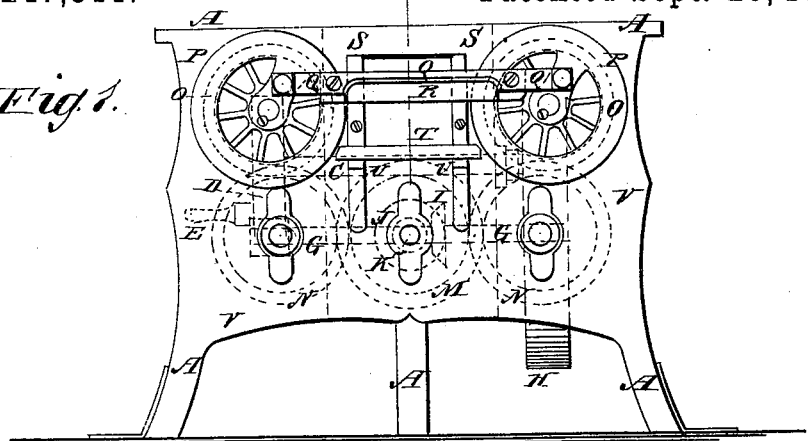
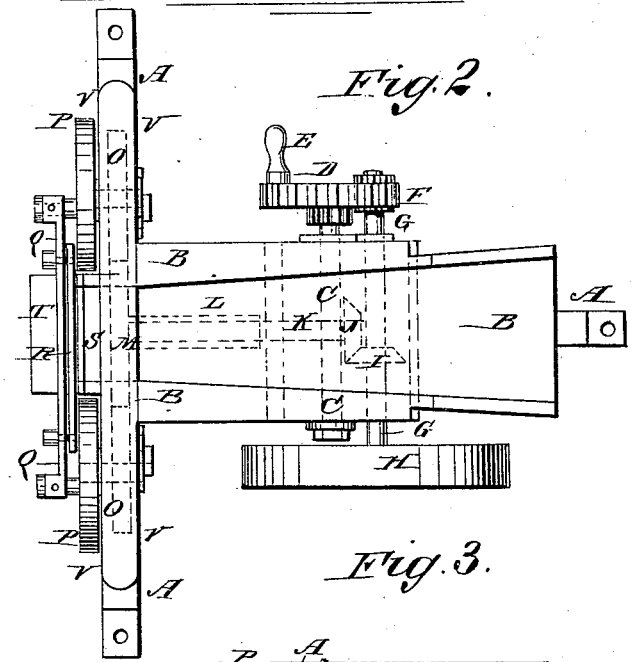
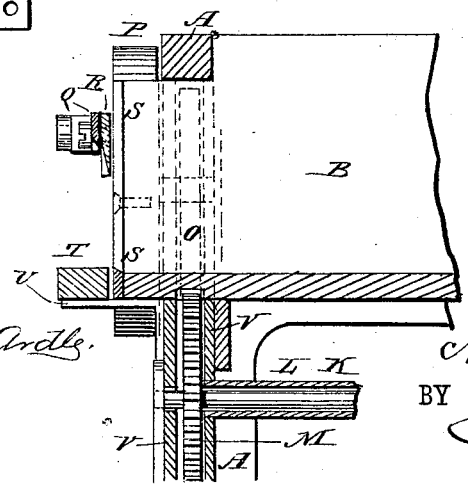
WITNESSES:
Francis McArdle
C. Sedgwick
INVENTOR:
N. Climenhegg
BY Munn & Co
ATTORNEYS.

UNITED STATES PATENT OFFICE.

NATHANIEL CLIMENHEGG, OF RIDGEWAY, ONTARIO, CANADA.

STRAW-CUTTER.

SPECIFICATION forming part of Letters Patent No. 247,311, dated September 20, 1881.

Application filed February 10, 1881. (Model.)

*To all whom it may concern:*

Be it known that I, NATHANIEL CLIMENHEGG, of Ridgeway, in the county of Welland, Province of Ontario, Dominion of Canada, have invented a new and useful Improvement in Feed-Cutters, of which the following is a specification.

Figure 1 is a front elevation of my improvement. Fig. 2 is a plan view of the same. Fig. 3 is a sectional side elevation of the forward part of the same.

Similar letters of reference indicate corresponding parts.

The object of this invention is to increase the effectiveness of feed-cutters and make them more easily operated.

The invention consists in combining shafts carrying the gear-wheels with a feed-box and crank-wheels carrying the knife-bar, as hereinafter described.

A represents the frame, and B the feed-box, of the cutter. To the frame A, below the feed-box B, is pivoted a transverse shaft, C, one end of which projects and has a large gear-wheel, D, attached to it. The gear-wheel D is provided with a handle, E, to adapt it to serve as a crank-wheel for operating the cutter. The teeth of the large gear-wheel D mesh into the teeth of the small gear-wheel F, attached to the end of a shaft, G, which works in bearings attached to the frame A, and has a fly-wheel, H, attached to its outer end.

To the middle part of the shaft G is attached a beveled-gear wheel, I, the teeth of which mesh into the teeth of a beveled-gear wheel, J, attached to the rear end of the shaft K. The shaft K is placed longitudinally with the machine, and revolves in bearings attached to the frame A, and has its forward part covered with a tubular sheath, L, to protect it from the cut feed.

To the forward end of the shaft K is attached a large gear-wheel, M, the teeth of which mesh into the teeth of two large gear-wheels, N, placed upon its opposite sides and pivoted to the frame-work of the machine. The teeth of the gear-wheels N mesh into the teeth of two gear-wheels, O, placed directly above them and pivoted to the frame A.

To the forward journals of the gear-wheels O are attached two cranks, P, which I prefer to make in the form of wheels, and heavy, to adapt them to serve as fly-wheels to give steadiness of motion to the machine.

To the crank-pins of the cranks or crank-wheels P are pivoted the ends of a cross-bar, Q. The lower middle part of the cross-bar Q is cut away upon a bevel, and to the inner sides of the end parts of the said cross-bar Q is bolted the knife R. With this construction the knife-bar Q and the knife R mutually stiffen and support each other, and can thus be made lighter than would otherwise be practicable. With this construction, as the machine is operated the knife R will be moved downward and longitudinally, making a drawing cut, and will thus easily pass through the substance being cut. The forward end of the feed-box B projects so as to be flush with the outer sides of the knife-carrying crank-wheels P, so that the knife can be connected with the outer sides of the crank-wheels P, so as to be conveniently accessible. The sides and bottom of the mouth of the feed-box B are faced with metal plates S, to prevent wear and provide a sharp edge, to hold the substance while being cut.

T is a cross-bar placed directly in front of the bottom of the feed-box B, and at such a distance from the forward end of the said bottom as to leave a slot to receive the edge of the knife R. The ends of the cross-bar T are attached to arms or brackets U, secured to the frame A. The cross-bar T is designed to support the projecting ends of the hay, straw, or other substance while being cut off, so that the knife R will make a clean cut.

The gearing M N O is inclosed by a casing, V, making the forward part of the frame double-walled, to protect the said gearing from the cut feed, and thus prevent it from being clogged.

Having thus fully described my invention, I claim as new and desire to secure by Letters Patent—

In a feed-cutter, the combination, with the feed-box and crank-wheels P, carrying the knife-bar, of the shafts C G K, carrying the gear-wheels D F I J M N O, as shown and described, for the purpose specified.

NATHANIEL CLIMENHEGG.

Witnesses:
ANDREW C. PHILLIPS,
ARTHUR C. PHILLIPS.